(12) United States Patent
Lee et al.

(10) Patent No.: US 7,269,109 B2
(45) Date of Patent: *Sep. 11, 2007

(54) APPARATUS FOR REPRODUCING DATA FROM INFORMATION STORAGE MEDIUM HAVING MULTIPLE STORAGE LAYERS WITH OPTIMAL POWER CONTROL (OPC) AREAS AND BUFFER AREAS

(75) Inventors: Kyung-geun Lee, Seongnam-si (KR);
Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/432,336

(22) Filed: May 12, 2006

(65) Prior Publication Data

US 2006/0203656 A1    Sep. 14, 2006

Related U.S. Application Data

(63) Continuation of application No. 10/866,087, filed on Jun. 14, 2004.

(60) Provisional application No. 60/483,233, filed on Jun. 30, 2003, provisional application No. 60/477,793, filed on Jun. 12, 2003.

(30) Foreign Application Priority Data

Sep. 8, 2003    (KR) ............................... 2003-62855

(51) Int. Cl.
*G11B 15/52*    (2006.01)
(52) U.S. Cl. ..................................... 369/47.53; 369/94
(58) Field of Classification Search .................... None
See application file for complete search history.

(56) References Cited

U.S. PATENT DOCUMENTS 6,687,194 B1    2/2004    Kobayashi et al.

(Continued)

FOREIGN PATENT DOCUMENTS

EP    1 318 509    6/2003

(Continued)

OTHER PUBLICATIONS

Preliminary Notice of the First Office Action issued May 24, 2006 by the Taiwan Intellectual Property Office re: Taiwanese Application No. 93116797 (10 pp).

(Continued)

*Primary Examiner*—Paul W. Huber
(74) *Attorney, Agent, or Firm*—Stein, McEwen & Bui, LLP

(57) ABSTRACT

An information storage medium and an apparatus for recording and/or reproducing the information storage medium capable of controlling optimal recording power without an influence of an optimal power control (OPC) area in a layer upon an OPC area in a different layer. The information storage medium includes at least one information storage layer including an optimal power control area for obtaining an optical recording condition. OPC areas in adjacent information storage layers are disposed within different radiuses of the information storage medium. Accordingly, even when the information storage medium is made eccentric or has a manufacturing error, a recording property of the information storage medium is prevented from being degraded due to an influence of an OPC area in an information storage layer upon an OPC area in an adjacent information storage layer.

11 Claims, 9 Drawing Sheets

U.S. PATENT DOCUMENTS

2002/0136122 A1* 9/2002 Nakano .................. 369/47.53
2003/0137909 A1* 7/2003 Ito et al. .................. 369/47.14
2003/0185121 A1* 10/2003 Narumi et al. ........... 369/47.53

FOREIGN PATENT DOCUMENTS

| JP | 8-329543 | 12/1996 |
|----|----------|---------|
| JP | 2000-76653 | 3/2000 |
| JP | 2000-182292 | 6/2000 |

OTHER PUBLICATIONS (U.S. 6,687,194) is substantially equivalent to reference AI (JP 2000-182292).

U.S. Appl. No. 10/875,793, filed Jun. 25, 2004, Kyung-geun Lee, Samsung Electronics Co., Ltd.

U.S. Appl. No. 10/875,794, filed Jun. 25, 2004, Kyung-geun Lee, Samsung Electronics Co., Ltd.

U.S. Appl. No. 10/866,087, filed Jun. 14, 2004, Kyung-geun Lee, Samsung Electronics Co., Ltd.

U.S. Appl. No. 11/204,170, filed Aug. 16, 2005, Kyung-geun Lee, Samsung Electronics Co., Ltd.

U.S. Appl. No. 11/432,337, filed May 12, 2006, Kyung-geun Lee, Samsung Electronics Co., Ltd.

U.S. Appl. No. 11/432,471, filed May 12, 2006, Kyung-geun Lee, Samsung Electronics Co., Ltd.

* cited by examiner

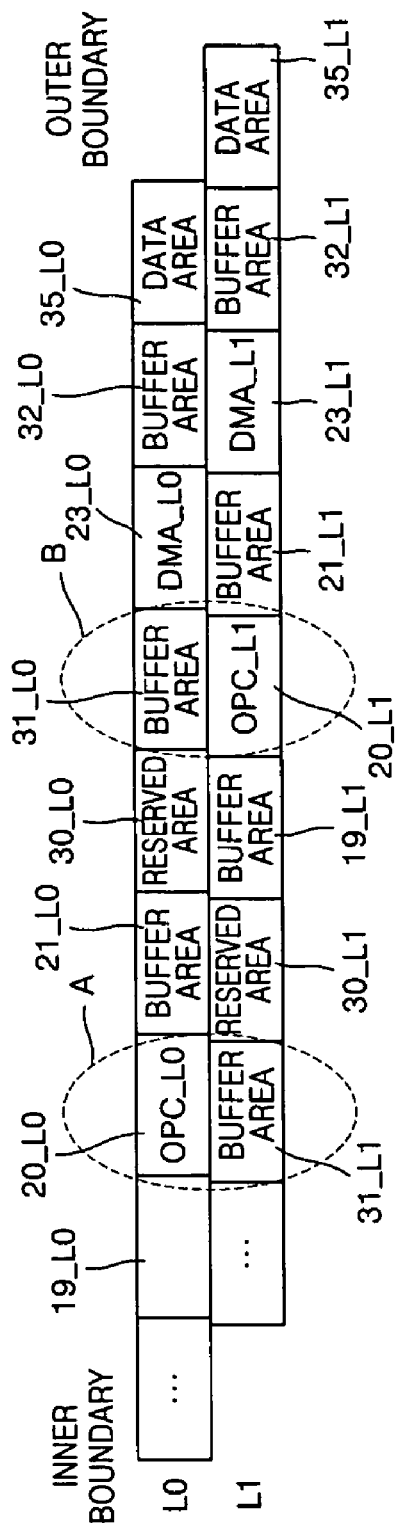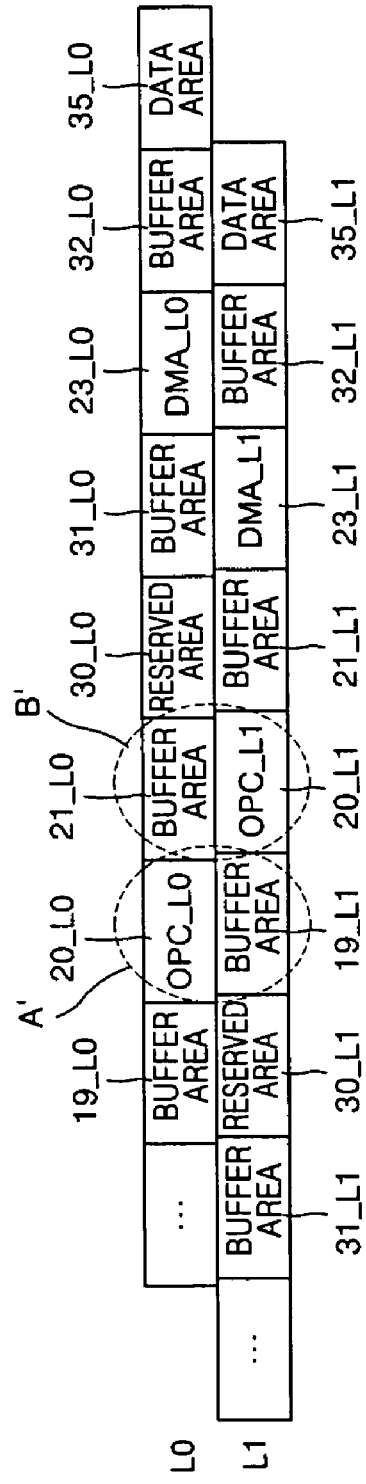

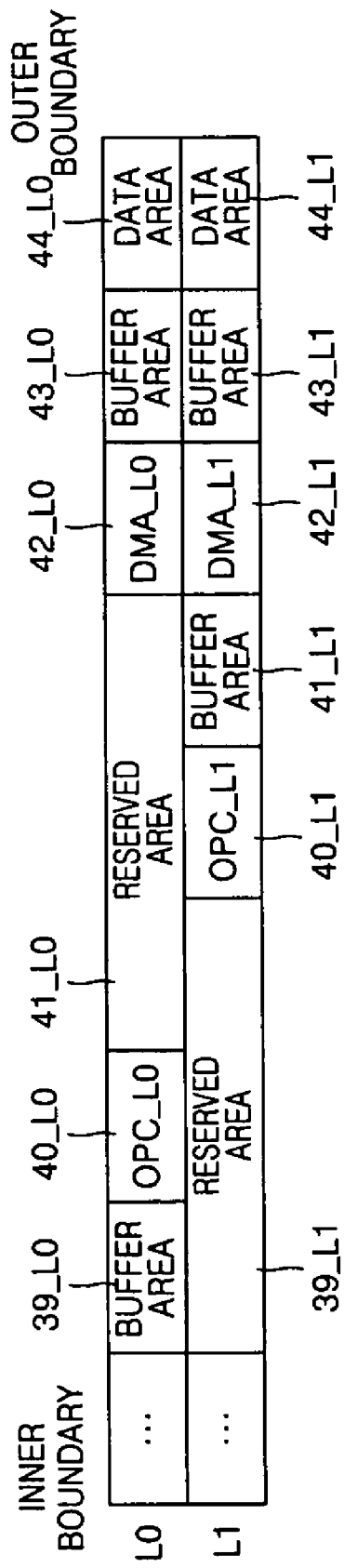
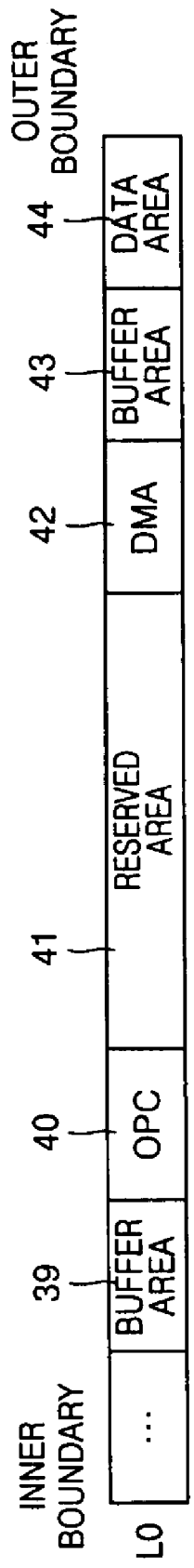

APPARATUS FOR REPRODUCING DATA FROM INFORMATION STORAGE MEDIUM HAVING MULTIPLE STORAGE LAYERS WITH OPTIMAL POWER CONTROL (OPC) AREAS AND BUFFER AREAS

CROSS-REFERENCE TO RELATED APPLICATIONS

This application is a continuation of application Ser. No. 10/866,087, filed on Jun. 14, 2004, now pending in the U.S. Patent and Trademark Office, which claims the benefit of Korean Patent Application No. 2003-62855, filed on Sep. 8, 2003, in the Korean Intellectual Property Office, and the benefits of U.S. Provisional Patent Application Nos. 60/477,793 and 60/483,233, filed on Jun. 12, 2003 and Jun. 30, 2003, respectively, the disclosures of which are incorporated herein in their entirety by reference.

BACKGROUND OF THE INVENTION

1. Field of the Invention

The present invention relates to recordable information storage media, and more particularly, to an information storage medium designed to control optimum writing power in optimal power control (OPC) areas even when eccentricity occurs among a plurality of information storage layers and a method and apparatus for recording/reproducing data on/from the information storage media.

2. Description of the Related Art

General information storage media are widely used as information recording media of optical pickup apparatuses for recording/reproducing data in a non-contact way. Optical disks are used as the information storage medium and are classified as compact disks (CDs) or digital versatile disks (DVDs) according to their information storage capacity. Examples of recordable, erasable, and reproducible optical disks are 650MB CD-R, CD-RW, 4.7 GB DVD+RW, and the like. Furthermore, HD-DVDs having a recording capacity of 25 GB or greater are under development.

As described above, information storage media have been developed to have a greater recording capacity. The recording capacity of an information storage medium can be increased in two representative ways by: 1) reducing the wavelength of a recording beam emitted from a light source; and 2) increasing the numerical aperture of an objective lens. In addition, there is another method of forming a plurality of information storage layers.

FIG. 1 schematically shows a dual-layered information storage medium having first and second information storage layers L0 and L1. The first and second information storage layers L0 and L1 include first and second optimal power control (OPC) areas 10L0 and 10L1, respectively, for obtaining an optimal writing power and first and second defect management area (DMAs) 13L0 and 13L1, respectively. The first and second OPC areas 10L0 and 10L1 are disposed to face each other.

Data is recorded in the first and second OPC areas 10L0 and 10L1 using various levels of writing power to find the optimum writing power. Hence, data may be recorded at a power level higher than the optimum writing power. Table 1 shows variations in the jitter characteristics of each of the first and second information storage layers L0 and L1 when data is recorded in the OPC areas with different levels of writing power.

TABLE 1

|  |  | Normal writing power | | | | Writing power about 20% higher than normal writing power | |
| --- | --- | --- | --- | --- | --- | --- | --- |
| | L0 | Writing | Unwritten | Writing | Written | Writing | Written |
| | L1 | Unwritten | Writing | Written | Writing | Written | Writing |
| Jitter | L0 | 5.9% | | 6.0% | 5.8% | | 5.9%->6.4% |
| | L1 | | 6.3% | 6.2% | 6.3% | 6.2% -> 6.3% | |
| Writing | L0 | 6.4 | | 6.3 | 6.3 | 7.5 | 6.4 |
| Power | L1 | | 6.0 | 6.0 | 6.2 | 6.0 | 7.2 |

According to Table 1, if data is recorded with normal writing power, the jitter characteristics of the first or second information storage layer L0 or L1 remain constant. On the other hand, if data is recorded with writing power about 20% higher than the normal writing power, the jitter characteristics of the OPC area of a first or second information storage layer L0 or L1 in which data has already been recorded are degraded. If data is recorded on one of the first and second information storage layers L0 and L1 with writing power more than 20% higher than the normal writing power, it can be expected that the jitter characteristics of the other information storage layer may be further degraded.

Hence, if the first and second OPC areas 10L0 and 10L1 of the first and second information storage layers L0 and L1 exist within an equal radius as shown in FIG. 1, one of them may not be usable.

The recording status of one of the first and second OPC areas 10L0 and 10L1 may affect the recording characteristics of the other OPC area. For example, as shown in FIG. 2A, if data has been recorded on a part 10L0_A of the first OPC area 10L0 and no data has been recorded on the residual area 10L0_B thereof, the recording property of a part of the second OPC area 10L1 which corresponds to the occupied part 10L0_A of the first OPC area 10L0 is different from that of a part of the second OPC area 10L1 which corresponds to the unoccupied part 10L0_B of the first OPC area 10L0. In other words, since the transmittance of the laser with respect to the occupied part 10L0_A of the first OPC area 10L0 is different from the transmittance of a laser with respect to the unoccupied part 10L0_B thereof, the recording property of the second OPC area 10L1 may be irregular over the area.

As described above, if the first and second OPC areas are disposed within an equal radius, they may not properly function.

During the manufacture of an information storage medium, eccentricity may occur. For example, an information storage medium having a single information storage layer may have eccentricity of about 70-80 μm(p-p) (where p denotes a peak). To manufacture an information storage medium having first and second information storage layers L0 and L1, the first and second storage layers L0 and L1 are separately manufactured and then attached to each other. When eccentricity occurs during the manufacture of each of the first and second information storage layers L0 and L1, they may be attached to each other such that areas of the first information storage layer L0 are not aligned with those of the second information storage layer L1 as shown in FIG. 2B.

When the first and second OPC areas 10L0 and 10L1 are not in line, overlapped areas generated due to the out-of-line arrangement may affect each other. For example, if data is recorded on the first OPC area OPC_L0 using higher power than the normal writing power, the first OPC area OPC_L0 adversely affects a defect management area (DMA_L1) of the second information storage layer L1 because the DMA_L1 contacts a part C of the first OPC area 10L0. Also, a part D of the second OPC area OPC_L1 may adversely affect a part of the first information storage layer that contacts the part D, and thus the part may not be used.

SUMMARY OF THE INVENTION

An aspect of the present invention provides an information storage medium including an area in which optimum power control (OPC) is performed, thereby preventing an area other than the OPC area from being affected by possible eccentricity.

Additional aspects and/or advantages of the invention will be set forth in part in the description which follows and, in part, will be obvious from the description, or may be learned by practice of the invention.

According to an aspect of the present invention, an information storage medium includes at least one information storage layer including an OPC area for obtaining an optical recording condition. OPC areas in adjacent information storage layers are disposed within different radiuses of the information storage medium.

According to an aspect of the present invention, when the OPC areas in the adjacent information storage layers are apart from each other a small distance in a radial direction of the information storage medium, the distance corresponds to at least a tolerance required upon manufacture of the information storage medium.

According to an aspect of the present invention, buffer areas each having a size corresponding to at least the tolerance is disposed on both sides of each of the OPC areas.

According to an aspect of the present invention, a length of the buffer area in the radial direction of the information storage medium is in the range of 5 to 100 µm.

According to an aspect of the present invention, an area for storing reproduction-only data is disposed in an information storage layer such as to face an OPC area of an adjacent information storage layer.

According to another aspect of the present invention, an information storage medium includes a plurality of information storage layers each including an OPC area for obtaining an optical recording condition. An OPC area in an odd-numbered information storage layer and an OPC area in an adjacent even-numbered information storage layer are disposed within different radiuses of the information storage medium such as not to face each other even when each of the information storage layers has a manufacturing error.

According to another aspect of the present invention, the information storage medium includes a defect management area and a user data area. A buffer area is included between the defect management area and the user data area.

According to another aspect of the present invention, an area for storing reproduction-only data may be disposed in an information storage layer such as to face an OPC area of an adjacent information storage layer.

According to another aspect of the present invention, an information storage medium includes a plurality of information storage layers, each including an OPC area for obtaining an optical recording condition and an area for storing reproduction-only data. An OPC area in an information storage layer is disposed to face a reproduction-only area of an adjacent information storage layer.

According to another aspect of the present invention, the reproduction-only area may be larger than the OPC area.

According to another aspect of the present invention, the buffer areas may be disposed at both sides of the OPC area, and each of the buffer areas may have a size obtained in consideration of at least one of the following factors: an error in the determination of a start position of each area; a size of a beam for recording and reproduction; and eccentricity.

According to another aspect of the present invention, the buffer areas are disposed at both sides of the optimal power control area, and the buffer area located in front of the optimal power control area may have a size corresponding to a pair of disk-related information and disk control data recorded once.

According to another aspect, a method of minimizing interference between a first optimal power control area in a first information storage layer and a second optimal power control area in a second information storage layer of an information storage medium, by disposing the first optimal power control area such that no overlap occurs with the second optimal power control area is provided.

BRIEF DESCRIPTION OF THE DRAWINGS

The above and/or other aspects and advantages of the present invention will become more apparent by describing in detail exemplary embodiments thereof with reference to the attached drawings of which:

FIGS. 4A and 4B illustrate different eccentric states of the dual-layered information storage medium of FIG. 3A;

FIG. 7A illustrates another variation of the dual-layered information storage medium of FIG. 3A;

FIG. 7B illustrates a variation of the single-layered information storage medium of FIG. 3B;

DETAILED DESCRIPTION OF THE EMBODIMENTS

Figure 1:
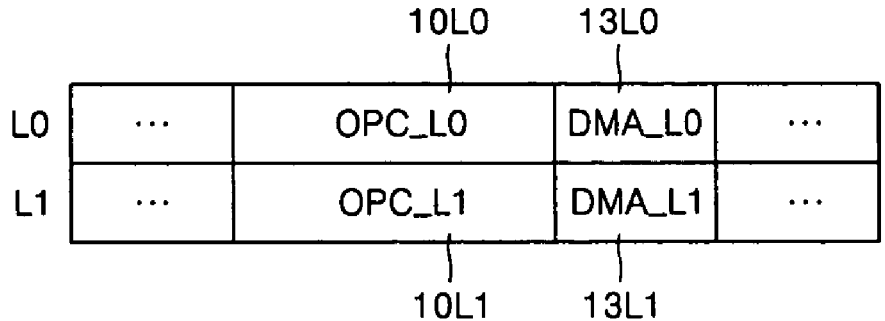
FIG. 1 illustrates a layout of a data area of a conventional dual-layered information storage medium.
Figure 2A:
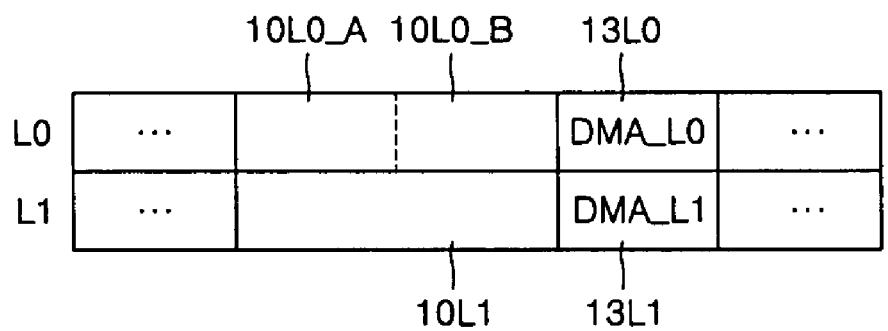
FIGS. 2A and 2B are views illustrating the influence of an OPC area upon an area other than the OPC area in the conventional dual-layered information storage medium of FIG. 1.
Figure 2B:
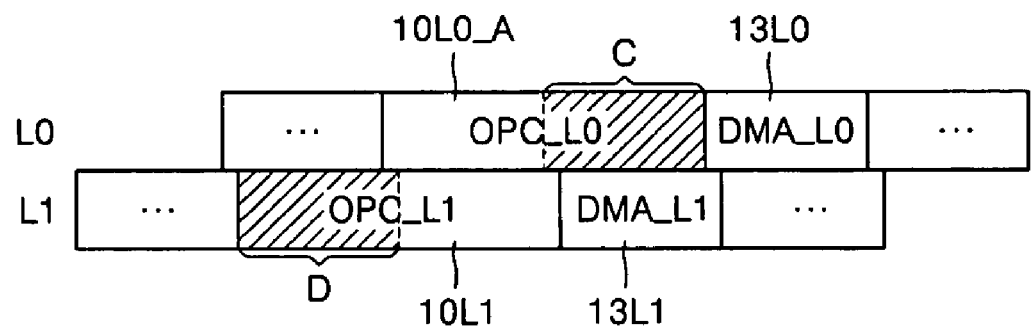

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3A:
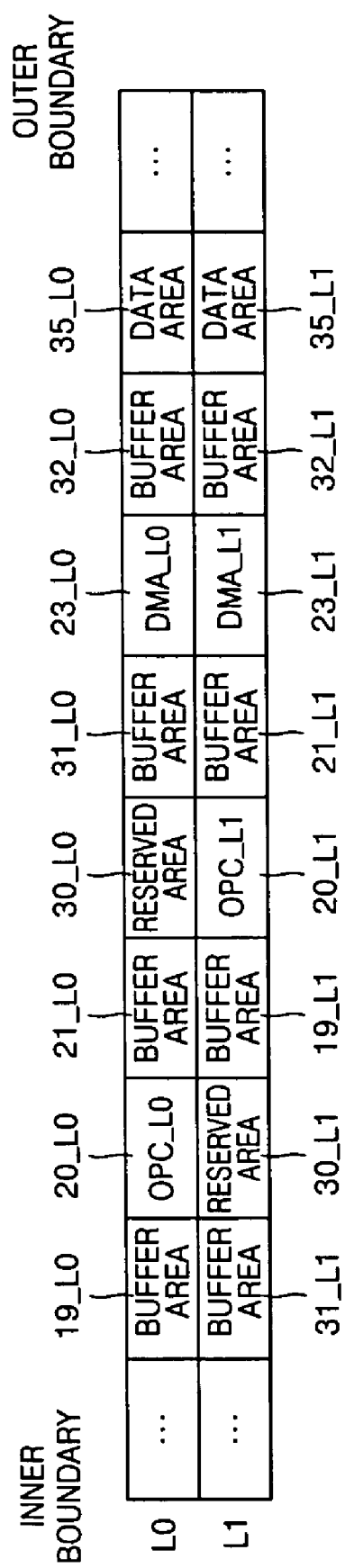
FIG. 3A illustrates a layout of a data area of a dual-layered information storage medium according to an embodiment of the present invention.
Figure 3B:
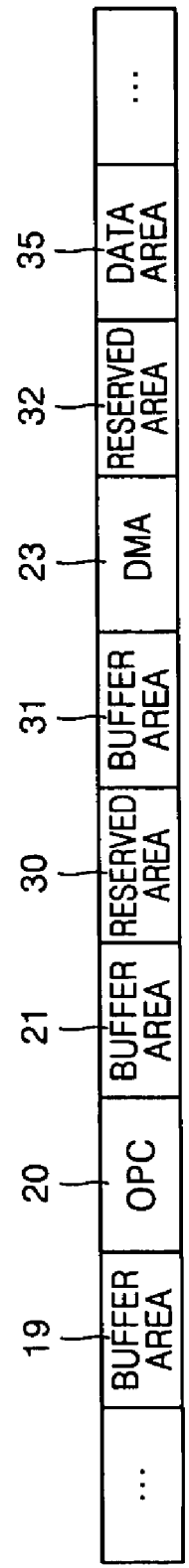
FIG. 3B illustrates a layout of a data area of a single-layered information storage medium according to an embodiment of the present invention.

Referring to FIGS. 3A and 3B, an information storage medium according to an embodiment of the present invention includes at least one information storage layer, each of which includes an optimal power control (OPC) area for obtaining optimal power. The OPC areas are disposed within different radii such that the OPC areas do not to face each other.

Each of the information storage layers further includes a defect management area (DMA) and a data area in which user data is recorded.

FIG. 3A illustrates a dual-layered information storage medium which includes first and second information storage layers L0 and L1. The first information storage layer L0 includes a first OPC area 20_L0, a first DMA 23_L0, and a first data area 35_L0, and the second information storage layer L1 includes a second OPC area 20_L1, a second DMA 23_L1, and a second data area 35_L1.

The first and second OPC areas 20_L0 and 20_L1 are located within different radiuses of the information storage medium. First buffer areas 19_L0 and 21_L0 are disposed in front of and behind the first OPC area 20_L0, respectively. Second buffer areas 19_L1 and 21_L1 are disposed in front of and behind the second OPC area 20_L1, respectively.

Preferably, but not always required, the first and second buffer areas 19_L0, 21_L0, 19_L1, and 21_L1 have lengths sufficient to cover a tolerance necessary for manufacturing an information storage medium. The tolerance is obtained in consideration of at least one of three factors: an error in the determination of the start position of each area; the size of a beam for recording and reproduction; and eccentricity. The error in the determination of the start position of each area is generated during mastering of the information storage medium and has a size of about 100 µm. In an information storage medium having no buffer areas between areas, when data is recorded on or reproduced from a track, an adjacent track is affected by a beam spot because the radius of the beam spot is typically greater than a track pitch. Thus, a buffer area is placed between areas. The size of the buffer area may be determined in consideration of the size of a recording and reproducing beam so as to prevent an influence of the recording and reproducing beam.

If the information storage medium used is manufactured with an error, the first and second buffer areas 19_L0, 21_L0, 19_L1, and 21_L1 prevent the first and second OPC areas 20_L0 and 20_L1 from affecting other areas.

The first and second OPC areas 20_L0 and 20_L1 are disposed within different radii so that the first and second OPC areas 20_L0 and 20_L1 do not to face each other. In other words, the first OPC area 20_L0 faces a reserved area 30_L1, and the second OPC area 20_L1 faces a reserved area 30_L0.

The first and second OPC areas 20_L0 and 20_L1 are manufactured to be spaced apart from each other by a distance corresponding to no less than an allowable eccentricity amount in the radial direction of the information storage medium. In other words, a difference between locations of the first and second OPC areas 20_L0 and 20_L1 in the radial direction is no less than the allowable eccentricity amount. The difference between the locations of the first and second OPC areas 20_L0 and 20_L1 denotes a distance between a rear end of the first OPC area 20_L0 and a front end of the second OPC area 20_L1.

Referring to FIG. 3A, the first and second buffer areas 19_L1 and 21_L0 preferably are separated by a distance corresponding to no less than an allowable eccentricity amount.

The dual-layered information storage medium of FIG. 3A further includes at least one pair of a pair of buffer areas 31_L0 and 31_L1 and a pair of buffer areas 32_L0 and 32_L1 and reserved areas 30_L0 and 30_L1. The reserved areas 30_L0 and 30_L1 may not be included. The buffer areas are disposed between the reserved area 30_L0 (or 30_L1) and the OPC area 20_L0 (or 20_L1) and between the DAM 23_L0 (or 23_L1) and the data area 35_L0 (or 35_L1).

In the dual-layered information storage medium of FIG. 3A, buffers are disposed on both sides of each of the first and second OPC areas 20_L0 and 20_L1 of the corresponding first and second information storage layers L0 and L1. Preferably, this principle is equally applied to a single-layered information storage medium of FIG. 3B.

Referring to FIG. 3B, the single-layered information storage medium includes an OPC area 20 and buffer areas 19 and 21 disposed on both sides of the OPC area 20. The single-layered information storage medium further includes a reserved area 30, a DMA 23, and a data area 35. As illustrated in FIG. 3B, a buffer area 31 is interposed between the reserved area 30 and the DMA 23, and a buffer area 32 is interposed between the DMA 23 and the data area 35.

To prevent an influence of eccentricity upon the information storage medium shown in FIG. 3A, each of the first and second buffer areas 19_L0, 21_L0, 19_L1, and 21_L1 has a size corresponding to the allowable eccentricity amount. Accordingly, even when the first and second information storage layers L0 and L1 are made eccentric by the maximum amount in the range of the allowable eccentricity amount, the OPC areas 20_L0 and 20_L1 of the first and second information storage layers, respectively, are arranged such that the OPC areas 20_L0 and 20_L1 do not face each other.

In an information storage medium with a 120 mm diameter, the allowable eccentricity amount is in the range of about 70-80 µm. In an information storage medium with a 60 mm diameter, the allowable eccentricity amount is in the range of about 20-30 µm. The allowable eccentricity amount varies depending on the size of an information storage medium. Hence, the first and second buffer areas 19_L0, 21_L0, 19_L1, and 21_L1 have sizes in the range of 5 to 100 µm so as to cover the allowable eccentricity amounts of all possible kinds of information storage media.

FIGS. 4A and 4B illustrate the first and second information storage layers L0 and L1, which are made eccentric by the maximum amount within the range of the allowable eccentricity amount. FIG. 4A illustrates the first and second information storage layers L0 and L1 made eccentric toward the inner and outer boundaries, respectively, of the information storage medium of FIG. 3A. FIG. 4B illustrates the first and second information storage layers L0 and L1 made eccentric toward the outer and inner boundaries, respectively, of the information storage medium of FIG. 3A.

Referring to FIG. 4A, when the information storage medium of FIG. 3A is in a maximal eccentric state, the first OPC area 20_L0 faces the buffer area 31_L1 (see circle A) or the reserved area 30_L1 instead of the second OPC area 20_L1. Similarly, the second OPC area 20_L1 faces the buffer area 31_L0 (see circle B) or the reserved area 30_L0 instead of the first OPC area 20_L0.

Referring to FIG. 4B, when the information storage medium of FIG. 3A is in a maximal eccentric state, the first OPC area 20_L0 faces the buffer area 19_L1 (see circle A'), and the second OPC area 20_L1 faces the buffer area 21_L0 (see circle B').

As described above, even when the information storage medium of FIG. 3A is in a maximal eccentric state, the first and second OPC areas 20_L0 and 20_L1 do not face each other and accordingly do not affect each other during a test for optimal power control. Of course, when the information storage medium as shown in FIG. 3A is not made eccentric, the first and second OPC areas 20_L0 and 20_L1 do not affect each other because they are originally disposed not to face each other.

The above-described layout of the dual-layered information storage medium of FIG. 3A can be equally applied to an information storage medium having more than two information storage layers. In other words, in an information storage medium having at least four information storage layers, odd-numbered information storage layers each have the layout of the first information storage layer L0 of FIG. 3A, and even-numbered information storage layers each have the layout of the second information storage layer L1 of FIG. 3A.

Figure 5A:
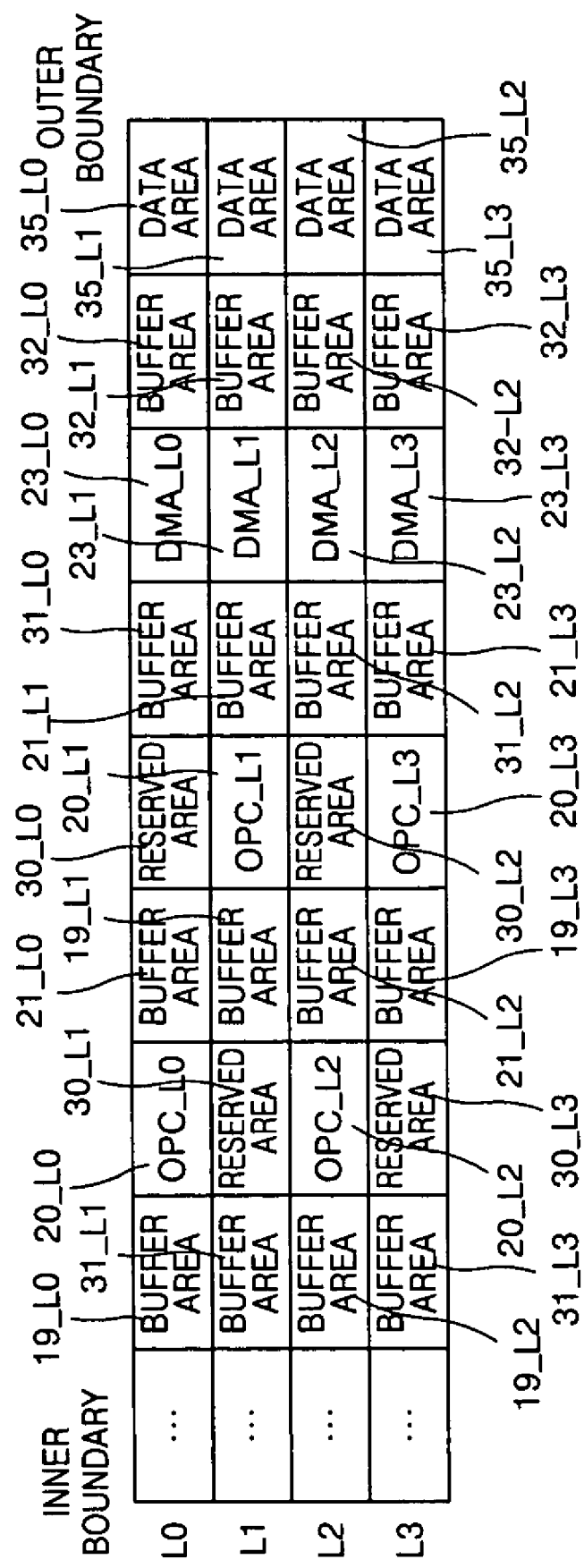
FIG. 5A illustrates a layout of a data area of a four-layered information storage medium according to an embodiment of the present invention.

FIG. 5A illustrates a four-layered information storage medium having first, second, third, and fourth information storage layers L0, L1, L2, and L3, respectively. The first, second, third, and fourth information storage layers L0, L1, L2, and L3 include OPC areas 20_L0, 20_L1, 20_L2, and 20_L3, respectively, DMAs 23_L0, 23_L1, 23_L2, and 23_L3, respectively, areas 35_L0, 35_L1, 35_L2, and 35_L3, respectively.

If an information storage medium has a plurality of information storage layers, it has an odd-numbered information storage layer(s) and an even-numbered information storage layer(s). OPC areas 20_L1 and 20_L3 included in the odd-numbered information storage layer are referred to as first OPC areas, and OPC areas 20_L0 and 20_L2 included in the even-numbered information storage layer are referred to as second OPC areas. The first and second OPC areas in the odd-numbered and even-numbered information storage layers, respectively, are disposed within different radiuses of the information storage medium. A pair of buffer areas 19_L0 and 21_L0, a pair of buffer areas 19_L1 and 21_L1, a pair of buffer areas 19_L2 and 21_L2, and a pair of buffer areas 19_L3 and 21_L3 for preventing an influence of the OPC due to eccentricity are disposed on both sides of each of the OPC areas 20_L0, 20_L1, 20_L2, and 20_L3, respectively.

Reserved areas 30_L0, 30_L1, 30_L2, and 30_L3 are further included, and buffer areas 31_L0, 31_L1, 31_L2, and 31_L3 may be further disposed adjacent to the reserved areas 30_L0, 30_L1, 30_L2, and 30_L3.

Figure 5B:
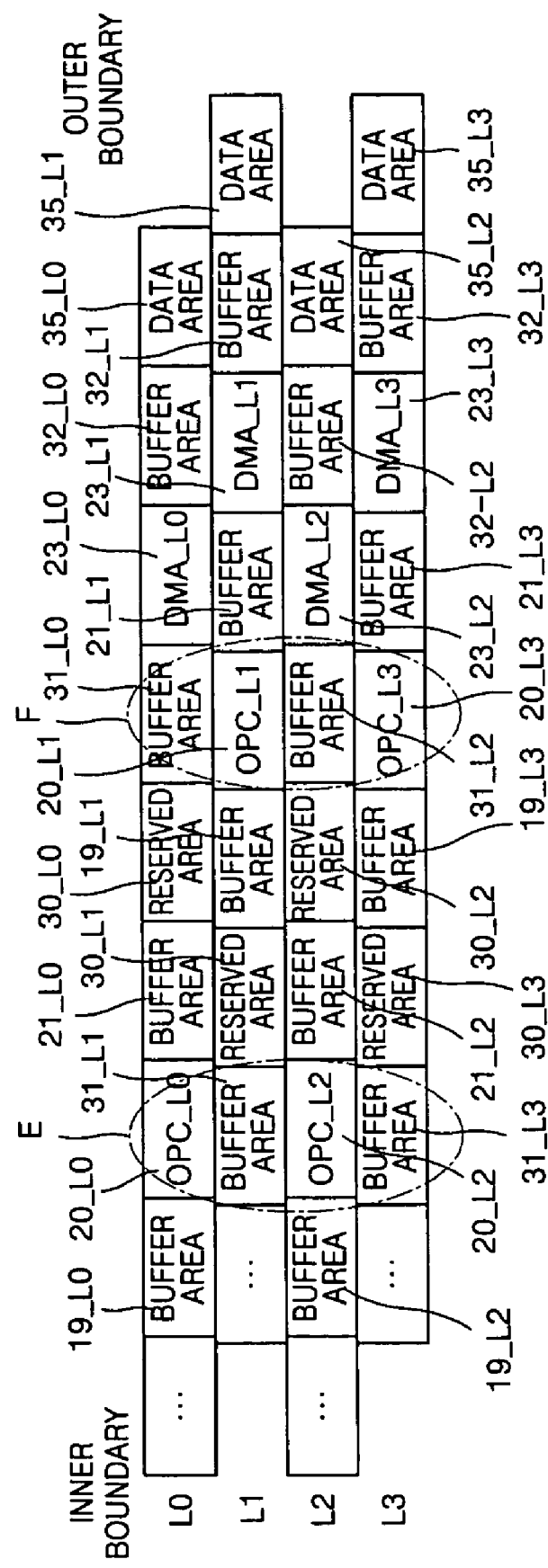
FIG. 5B illustrates an eccentric state of the four-layered information storage medium of FIG. 5A.

FIG. 5B illustrates an eccentric state of the four-layered information storage medium of FIG. 5A. Even when an information storage medium having at least three information storage layers is made eccentric, OPC areas in adjacent information storage layers do not face each other as illustrated in circles E and F of FIG. 5B. Hence, an influence of the OPC executed in an OPC area upon another OPC area can be prevented.

Figure 6A:
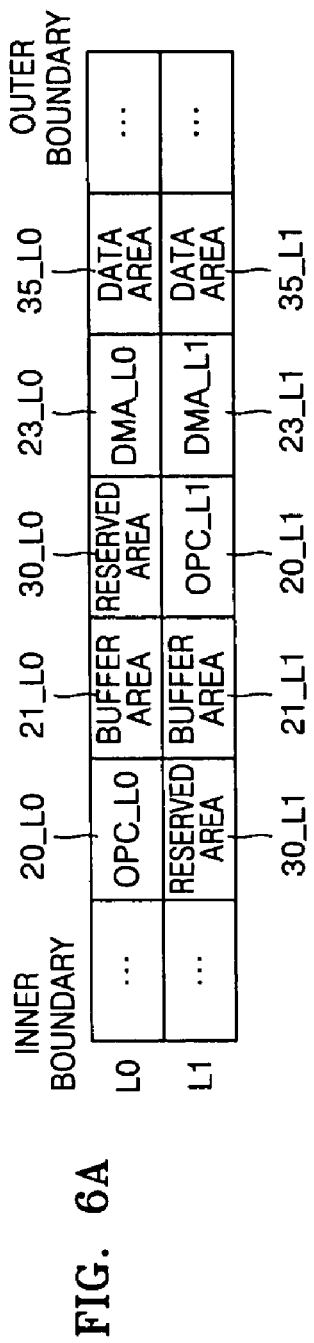
FIG. 6A illustrates a variation of the dual-layered information storage medium of FIG. 3A.

Referring to FIG. 6A, a variation of the dual-layered information storage medium of FIG. 3A includes at least one information storage layer which includes an OPC area for obtaining optimal power, a DMA, and a data area in which user data is recorded. A buffer area is disposed adjacent to the OPC area toward an inner or outer boundary of the information storage medium.

The dual-layered information storage medium of FIG. 6A includes first and second information storage layers L0 and L1. The first and second OPC areas 20_L0 and 20_L1 of the first and second information storage layers L0 and L1 are disposed within different radiuses of the information storage medium such that the first and second OPC areas 20_L0 and 20_L1 do not to face each other. The first and second OPC areas 20_L0 and 20_L1 are disposed to be spaced apart from each other in the radial direction of the information storage medium by a distance corresponding to at least a maximum eccentricity amount.

The first buffer area 21_L0 is disposed on a side of the first OPC area 20_L0 that faces the outer boundary of the information storage medium, and the second buffer area 19_L1 is disposed on a side of the second OPC area 20_L1 that faces the inner boundary of the information storage medium. When the information storage medium has no eccentricity, the first and second buffer areas 21_L0 and 19_L1 face each other. The first and second buffer areas 21_L0 and 19_L1 have a length corresponding to at least the maximum eccentricity amount. The reserved areas 30_L0 and 30_L1 are disposed adjacent to the first and second buffer areas 21_L0 and 19_L1.

In the information storage medium of FIG. 6A, no buffer areas are included between the DMA 23_L0 and the data area 35_L0 and between the DMA 23_L1 and the data area 35_L1. Thus, the information storage medium of FIG. 6A provides more area for storing user data than the information storage medium of FIG. 3A.

Figure 6B:
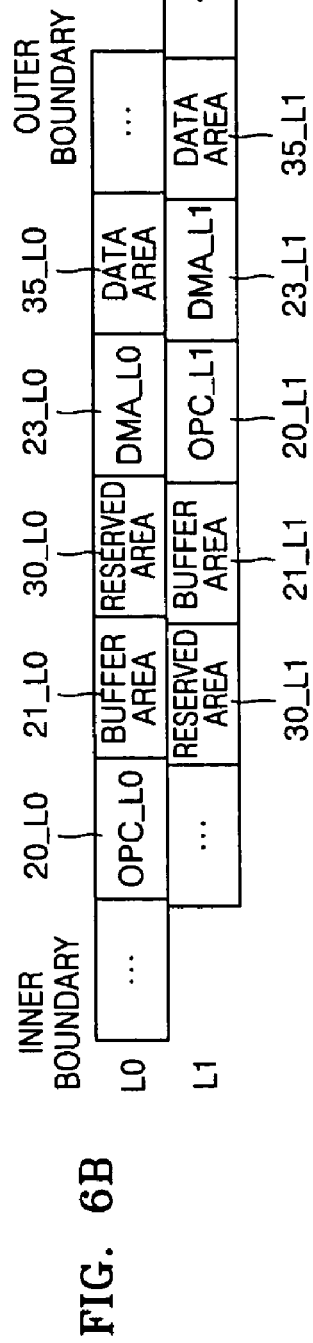
FIGS. 6B and 6C illustrate different eccentric states of the dual-layered information storage medium of FIG. 6A.
Figure 6C:
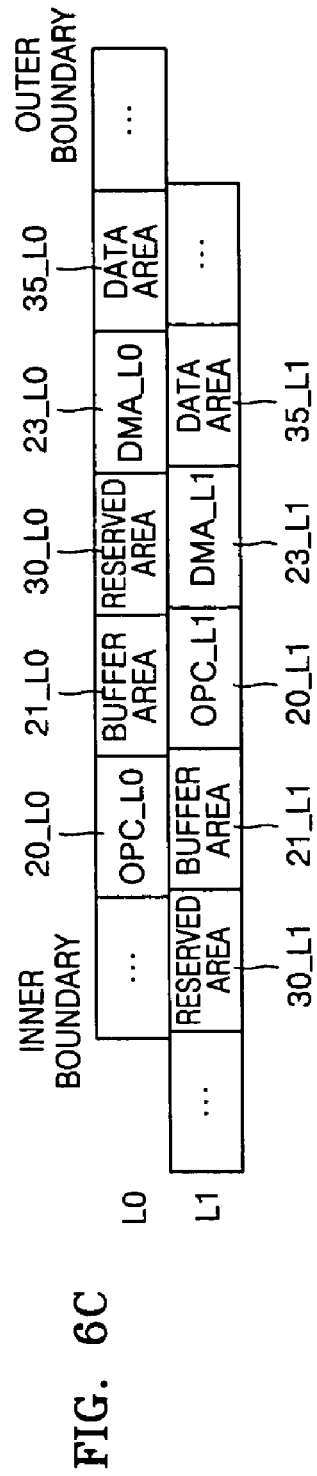

FIGS. 6B and 6C illustrate different maximum eccentric states of the dual-layered information storage medium of FIG. 6A. When the first and second information storage layers L0 and L1 are made eccentric toward the inner and outer boundaries, respectively, of the information storage medium of FIG. 6A as shown in FIG. 6B, the second OPC area 20_L1 faces the DMA 23_L0 in the first information storage layer L0.

When the first and second information storage layers L0 and L1 are made eccentric toward the outer and inner boundaries, respectively, of the information storage medium of FIG. 6A as shown in FIG. 6C, the first OPC area 20_L0 faces the buffer area 19_L1 of the second information storage layer L1, and the second OPC area 20_L1 faces the buffer area 21_L0 in the first information storage layer L0. In other words, in this case, the first and second OPC areas 20_L0 and 20_L1 never face each other even when the information storage medium of FIG. 6A is made eccentric. Thus, the first and second OPC areas 20_L0 and 20_L1 do not affect each other. Also, a recording capacity of the information storage medium of FIG. 6A can be increased by reducing the buffer area as much as possible.

FIG. 7A illustrates another embodiment of the dual-layered information storage medium of FIG. 3A. Referring to FIG. 7A, the first and second information storage layers L0 and L1 include first and second OPC areas 40_L0 and 40_L1, respectively, DMAs 42_L0 and 42_L1, respectively, and data areas 44_L0 and 44_L1, respectively. A buffer area 39_L0 and a first reserved area 41_L0 are disposed at both sides of the first OPC area 40_L0, and a buffer area 41_L1 and a second reserved area 39_L1 are disposed at both sides of the second OPC area 40_L1. The information storage medium of FIG. 7A is the same as that of FIG. 3A in that the first and second OPC areas 40_L0 and 40_L1 are disposed within different radiuses. In contrast with FIG. 3A, the first and second reserved areas 41_L0 and 39_L1 of FIG. 7A have different sizes than the reserved areas 30_L and 30_L1 of FIG. 3A. In FIG. 3A, the buffer area 21_L0, the reserved area 30_L0, and the buffer area 31_L0 are sequentially disposed on a side of the first OPC area 20_L0 that faces the outer boundary. Similarly, in FIG. 7A, the first reserved area 41_L0, which has a length corresponding to the reserved area 30_L0 and the buffer areas 21_L0 and 31_L0, is disposed on a side of the first OPC area 40_L0 that faces the outer boundary.

Also, in FIG. 3A, the buffer area 31_L1, the reserved area 30_L1, and the buffer area 21_L1 are sequentially disposed on a side of the second OPC area 20_L1 that faces the inner boundary. Similarly, in FIG. 7A, the second reserved area 39_L1, which has a length corresponding to the reserved area 30_L1 and the buffer areas 21_L1 and 31_L, is disposed on a side of the second OPC area 40_L1 that faces the inner boundary.

As described above, the information storage media according to the various embodiments are manufactured so that OPC areas in adjacent information storage layers are located within different radiuses and that each of the OPC areas face a reserved area or a buffer area, thereby preventing a recording property from being degraded due to OPC. Preferably, the reserved area or the buffer area that faces each of the OPC areas is longer than each of the OPC areas.

FIG. 7B illustrates another embodiment of the single-layered information storage medium of FIG. 3B. To have a consistency with the dual-layered information storage medium of FIG. 7A, the single-layered information storage medium of FIG. 7B includes an OPC area 40, a buffer area 39 disposed at one side of the OPC area 40, and a reserved area 41 disposed at the other side of the OPC area 40. A DMA 42, a buffer area 43, and a data area 44 are disposed adjacent to the reserved area 41. In this embodiment, the reserved area 41 is larger than the buffer area 39.

Figure 8:
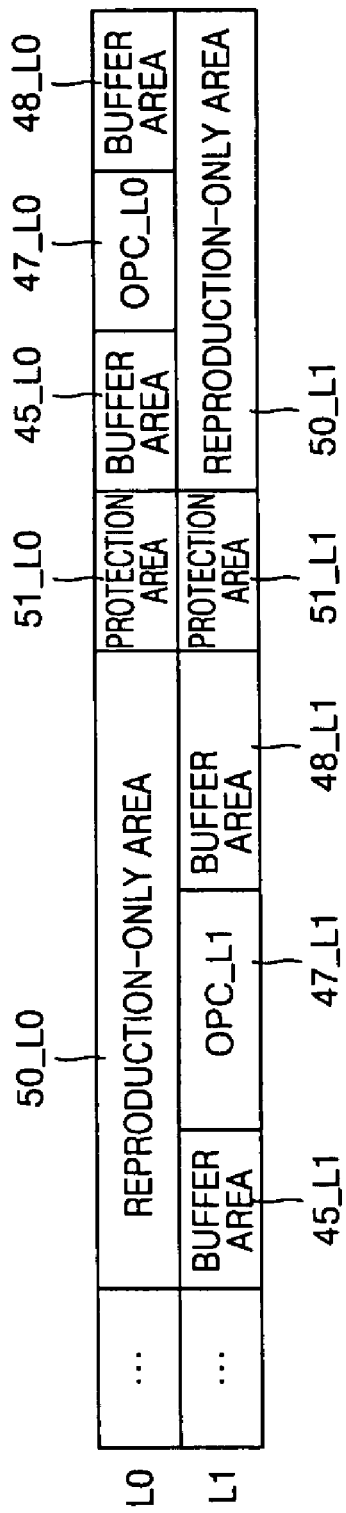
FIG. 8 illustrates a layout of a data area of a dual-layered information storage medium according to another embodiment of the present invention.

FIG. 8 illustrates a layout of a data area of a dual-layered information storage medium according to another embodiment of the present invention. The dual-layered information storage medium of FIG. 8 includes first and second information storage layers L0 and L1. A second OPC area 47_L1 for controlling optimal recording power is included in the second information storage layer L1, and a first reproduction-only area 50_L0 for storing reproduction-only data is disposed at a location of the first information storage layer L0 that faces the second OPC area 47_L1. The first reproduction-only area 50_L0 is larger than the second OPC area 47_L1. Examples of the reproduction-only data include a disc-related information and disk control data.

The first information storage layer L0 further includes a first protection area 51_L0 and a first OPC area 47_L0, between buffer areas 45_L0 and 48_L0. The second information storage layer L1 further includes buffer areas 45_L1 and 48_L1, a second protection area 51_L1, and a second reproduction-only area 50_L1. The buffer areas 45_L1 and 48_L1 are disposed at both sides of the second OPC area 47_L1.

The first and second protection areas 51_L0 and 51_L1 are used to obtain the time during which a disk drive accesses each area of a disk. In other words, a protection area is allocated to transit an area to another area in the radial direction of a disk.

Each of the first and second buffer areas 45_L0, 45_L, 48_L0, and 48_L1 has a length sufficient to cover a tolerance necessary for manufacturing an information storage medium. The tolerance is obtained in consideration of at least one of three factors: an error in the determination of the start position of each area; the size of a beam for recording and reproduction; and eccentricity. The error in the determination of the start position of each area is generated during mastering and has a size of about 100 μm. In an information storage medium having no buffer areas between areas, when data is recorded on or reproduced from a track, an adjacent track is affected by a beam spot because the radius of the beam spot is typically greater than a track pitch. Thus, a buffer area is placed between areas in embodiments of the present invention. The size of the buffer area may be determined in consideration of the size of a recording and reproducing beam so as to prevent an influence of the recording and reproducing beam.

To prevent an influence of the OPC from an adjacent information storage layer, the first OPC area 47_L0 in the first information storage layer L0 is located to face the second reproduction-only area 50_L1, and the second OPC area 47_L1 in the second information storage layer L1 is located to face the first reproduction-only area 50_L0.

Disk-related information and disk control data, which are examples of reproduction-only data, may be recorded many times in the first and second reproduction-only areas 50_L0 and 50_L1 in order to increase the reliability of information. In this case, to face an area corresponding to at least one pair of disk-related information and disk control data, each of the buffer areas 45_L0 and 45_L1 is longer than a pair of disk-related information and disk control data for one recording.

Because the recording of a reproduction-only area is rarely affected by the OPC process, the area is located directly over or below an OPC area in the information storage medium of FIG. 8. Thus, while the reproduction-only area is used to prevent an influence of OPC in an OPC area upon another OPC area, the reproduction only area is also used as a data area. Also, because the first and second OPC areas 47_L0 and 47_L1 as arranged never face each other even when eccentricity occurs in the information storage medium of FIG. 8, performing an OPC process in an OPC area does not affect another OPC area which is on a different layer.

Figure 9:
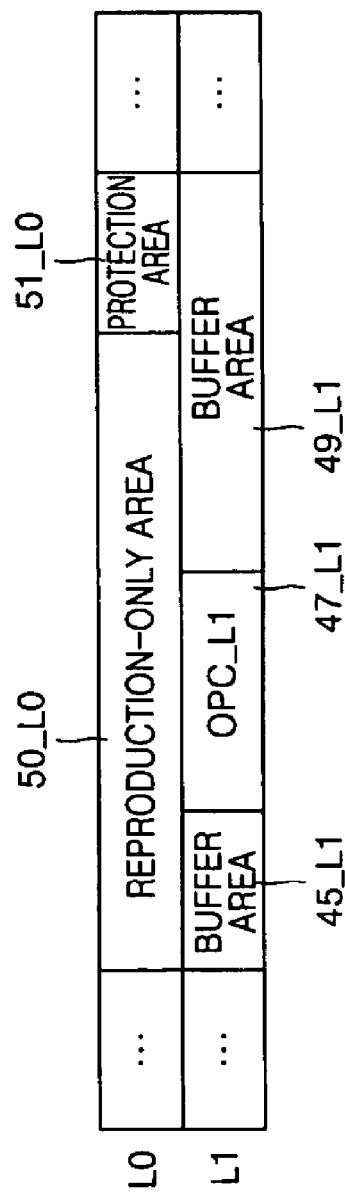
FIG. 9 illustrates a variation of the dual-layered information storage medium of FIG. 8.

FIG. 9 illustrates a variation of the dual-layered information storage medium of FIG. 8 in the dual-layered information storage medium of FIG. 9, a first information storage layer L0 includes the first reproduction-only area 50_L0 of FIG. 8, in which disk-related information for reproduction-only and disk control data for reproduction-only are recorded, and a first protection area 51_L0. A second information storage layer L1 includes an OPC area 47_L1 that faces the first reproduction-only area 50_L0. First and second buffer area 45_L1 and 49_L1 are disposed at both sides of the OPC area 47_L1. The information storage medium of FIG. 9 is different from that of FIG. 8 in that the second buffer area 49_L1 is sized to approximate the size of the second buffer 48_L1 of FIG. 8 and the second protection area 51_L1 of FIG. 8. As described above, the buffer area may have various sizes depending on its purpose, use, or the like.

Even if the information storage media of FIGS. 8 and 9 are made eccentric, or an error is generated in a location of each of the information storage media of FIGS. 8 and 9 where each area starts, the OPC area 47_L1 always faces the first reproduction-only area 50_L0. Hence, the reproduction-only area 50_L0 prevents the OPC in an OPC area of a layer from affecting an area of an adjacent layer and is used as a data area.

Figure 10:
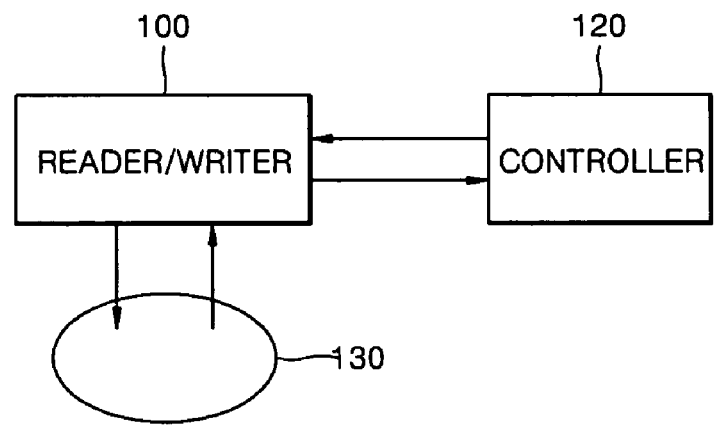
FIG. 10 is a block diagram of an apparatus for recording/reproducing information to/from an information storage medium according to an embodiment of the present invention.

FIG. 10 is a block diagram of a recording and/or reproducing apparatus in which the information storage media of FIGS. 3-9 are implemented. Referring to FIG. 10, the recording and/or reproducing apparatus includes a writer/reader unit 100 and a controller 120. The reader/writer unit 100 reads from and writes to the information storage medium 130 according to commands from the controller 120.

Figure 11:
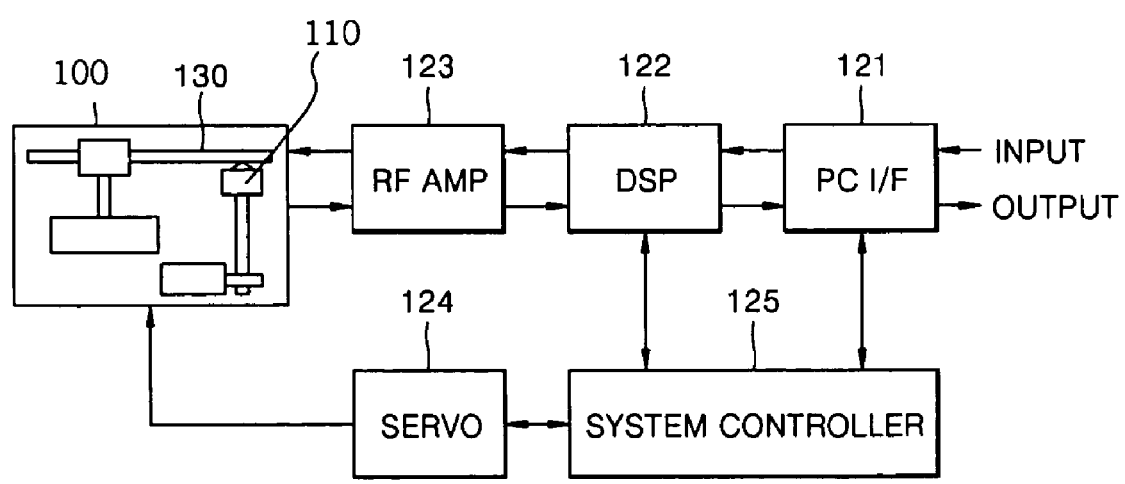
FIG. 11 is a block diagram of a disk drive in which the apparatus of FIG. 10 is implemented.

FIG. 11 is a more detailed block diagram of the recording and/or reproducing apparatus of FIG. 10. Referring to FIG. 11, the information storage medium 130 is loaded in the reader/writer unit 100. The reader/writer unit 100 includes an optical pickup 110 which reads from and writes to the information storage medium 130. The recording and/or reproducing apparatus further includes a PC I/F 121, a DSP 122, an RF AMP 123, a servo 124, and a system controller 125, all of which constitute the controller 120.

Upon a recording operation being initiated, the PC I/F 121 receives a recording command together with data to be recorded, from a host (not shown). The system controller 125 performs the initialization necessary for recording, such as determining an OPC. More specifically, the system controller 125 reads out information necessary for initialization, such as, disk-related information stored in a lead-in area of an information storage medium 130, and prepares for recording based on the read-out information. The DSP 122 performs ECC encoding on the to-be-recorded data received from the PC I/F 121 by adding data such as parity to the received data, and then modulates the ECC-encoded data in a specified manner. The RF AMP 123 converts the data received from the DSP 122 into an RF signal. The pickup 110 records the RF signal received from the RF AMP 123 to the information storage medium 130. The servo 124 receives a command necessary for servo control from the system controller 125 and servo-controls the pickup 110. If the information storage medium 130 stores no reproducing speed information, the system controller 125 commands the pickup 110 to write the reproducing speed information to a specified area of the information storage medium 130 when recording starts, while recording is being executed, or after recording has been completed.

Upon a reproduction operation being initiated, the PC I/F 121 receives a reproduction command from the host (not shown). The system controller 125 performs the initialization necessary for reproduction. When the initialization is completed, the system controller 125 reads out reproducing speed information recorded on the information storage medium 130 and performs reproduction at a reproducing speed corresponding to the read-out reproducing speed information. The pickup 110 projects a laser beam onto the information storage medium 130, receives a laser beam reflected by the information storage medium 130, and outputs an optical signal. The RF AMP 123 converts the optical signal received from the pickup 110 into an RF signal, supplies modulated data obtained from the RF signal to the DSP 122, and supplies a servo control signal obtained from the RF signal to the servo 124. The DSP 122 demodulates the modulated data and outputs data obtained through ECC error correction. The servo 124 receives the servo control signal from the RF AMP 123 and a command necessary for servo control from the system controller 125 and servo-controls the pickup 110. The PC I/F 121 sends data received from the DSP 122 to the host (not shown).

A method of recording data to an information storage medium having multiple layers according to an embodiment of the present invention comprising recording data in the optimal power control area and obtaining an optical recording condition. The optimal power control areas are disposed in adjacent ones of the information storage layers within different radiuses of the information storage medium such that interference among the optimal power control areas is prevented.

As described above, even when an information storage medium according to the present invention is made eccentric or has a manufacturing error, a recording property of the information storage medium is prevented from being degraded due to an influence of an OPC area in an information storage layer upon an OPC area in an adjacent information storage layer.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A reproducing apparatus, comprising:
   an optical pickup which reads data from storage layers of a storage medium; and
   a controller which controls the optical pickup to read reproducing and/or recording speed information on the storage medium and to reproduce and/or record the data from the storage layers of the storage medium at a reproducing and/or recording speed,
   wherein each of the storage layers includes an optimal power control area for use in obtaining an optical recording condition, and one of a buffer area and a reserved area disposed at one side of the optimal power control area, and
   wherein the optimal power control areas in adjacent ones of the storage layers are disposed within different radii of the storage medium such that one of the buffer area and the reserved area disposed in one of the storage layers faces the optimal power control area disposed in an adjacent one of the storage layers.

2. The apparatus of claim 1, wherein each of the storage layers further comprises another buffer disposed on an opposite side of each of the optimal power control areas.

3. The apparatus of claim 2, wherein the reserved area is disposed adjacent to one of the buffer areas disposed at one side of the optimal power control area in one of the storage layers such as to face the optimal power control area in an adjacent one of the storage layers.

4. The apparatus of claim 1, wherein each of the storage layers further comprises a plurality of data recording areas and another buffer area interposed between adjacent data-recording areas.

5. The apparatus of claim 1, wherein each of the storage layers further comprises a defect management area, a user data area, and another buffer area disposed between the defect management area and the user data area.

6. The apparatus of claim 2, wherein a length of each of the buffer areas in the radial direction of the storage medium is in the range of 5 to 100 μm.

7. The apparatus of claim 1, wherein a reproduction-only area storing reproduction-only data is disposed in one of the storage layers such that the reproduction-only area faces the optimal power control area of the adjacent one of the storage layers.

8. The apparatus of claim 7, wherein disk-related information and disk control data are recorded in the reproduction-only area for storing the reproduction-only data.

9. A storage medium comprising:
a plurality of storage layers, each including an optimal power control area used for obtaining an optimum recording condition, buffer areas and a reproduction-only area storing reproduction-only data, and wherein the reproduction-only area of one of the storage layers is arranged to face the optical power control area and the buffer areas of an adjacent one of the storage layers.

10. The storage medium of claim 9, wherein the reproduction-only area of the one of the storage layers is larger than the optimal power control area of the adjacent one of the storage layers.

11. The storage medium of claim 9, wherein the buffer areas are disposed at both sides of each of the optimal power control areas.

* * * * *